(12) United States Patent
Kelly et al.

(10) Patent No.: US 10,975,784 B2
(45) Date of Patent: Apr. 13, 2021

(54) METHOD AND SYSTEM FOR CYLINDER IMBALANCE DETECTION

(71) Applicant: Ford Global Technologies, LLC, Dearborn, MI (US)

(72) Inventors: Tyler Kelly, Plymouth, MI (US); Douglas Martin, Canton, MI (US); John Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 16/405,939

(22) Filed: May 7, 2019

(65) Prior Publication Data

US 2020/0355134 A1 Nov. 12, 2020

(51) Int. Cl.
| | | |
|---|---|---|
| F02D 41/00 | (2006.01) | |
| F02D 41/30 | (2006.01) | |
| F02D 41/14 | (2006.01) | |
| G01M 15/10 | (2006.01) | |

(52) U.S. Cl.
CPC ....... *F02D 41/0085* (2013.01); *F02D 41/009* (2013.01); *F02D 41/145* (2013.01); *F02D 41/1439* (2013.01); *F02D 41/1458* (2013.01); *F02D 41/3005* (2013.01); *G01M 15/106* (2013.01); *F02D 2200/101* (2013.01); *F02D 2200/1002* (2013.01)

(58) Field of Classification Search
CPC ............. F02D 41/0085; F02D 41/1441; F02D 41/1454; F02D 41/22; F02D 41/26; F02D 41/1458; F02D 2200/1004; F02D 35/0092; Y02T 10/40
See application file for complete search history.

(56) References Cited

U.S. PATENT DOCUMENTS

| | | | |
|---|---|---|---|
| 7,802,563 B2* | 9/2010 | Behr | F02D 41/0082 123/692 |
| 9,650,977 B2* | 5/2017 | Martin | F02D 41/145 |
| 9,752,517 B2* | 9/2017 | Rollinger | F02D 31/001 |
| 9,885,305 B2* | 2/2018 | Jammoussi | F02D 41/1497 |
| 2003/0209235 A1* | 11/2003 | Javaherian | F02D 41/0085 123/674 |
| 2009/0259382 A1* | 10/2009 | McKay | F02D 41/0085 701/102 |
| 2013/0184969 A1* | 7/2013 | Rollinger | F02D 41/22 701/103 |
| 2014/0288802 A1* | 9/2014 | Katayama | F02D 41/1456 701/103 |
| 2017/0350332 A1* | 12/2017 | Martin | F02D 41/1495 |

* cited by examiner

*Primary Examiner* — Sizo B Vilakazi
(74) *Attorney, Agent, or Firm* — Geoffrey Brumbaugh; McCoy Russell LLP

(57) ABSTRACT

Methods and systems are provided for detection of cylinder-to-cylinder air fuel ratio imbalance in engine cylinders. In one example, a method may include indicating air fuel ratio imbalance in an engine cylinder based on a comparison of an estimated cylinder acceleration for the cylinder and a calibrated cylinder acceleration for each of the engine cylinders. The indication of imbalance may be further confirmed based on one or more of an exhaust air-fuel ratio, an exhaust manifold pressure, and an individual cylinder torque weighted by respective confidence factors.

19 Claims, 7 Drawing Sheets

METHOD AND SYSTEM FOR CYLINDER IMBALANCE DETECTION

FIELD

The present description relates generally to methods and systems for determining cylinder-to-cylinder torque imbalance in an internal combustion engine of a vehicle.

BACKGROUND/SUMMARY

Engine emissions compliance requires detection of air-fuel ratio (AFR) imbalances across all engine cylinders. An AFR imbalance between cylinders may occur when the AFR in one or more cylinders is different from the other cylinders due to issues such as intake manifold leakage, fuel injector issues, exhaust gas recirculation issues, and fuel flow delivery issues. In addition to degrading emissions, cylinder-to-cylinder imbalances may result in torque errors that reduce engine performance and vehicle drivability.

One example approach for detecting cylinder-to-cylinder AFR imbalances is shown by Behr et al. in U.S. Pat. No. 7,802,563. Therein, AFR imbalance is identified based on a response of a Universal Exhaust Gas Oxygen (UEGO) sensor at frequencies that are at or above a firing frequency of the cylinders during selected operating conditions. Specifically, when the engine is not operating under transient conditions, imbalance is identified if the integration of high frequency differential signals detected by the UEGO sensor is higher than a threshold. Still other approaches for AFR imbalance detection involve detecting AFR imbalance based on exhaust manifold pressure estimated by a pressure sensor and/or individual cylinder torque estimated by a crankshaft torque sensor.

However, the inventors herein have recognized potential issues with such methods. When using exhaust gas sensors, as in the approach of Behr, there may be conditions where cylinder-to-cylinder imbalance is not detected due to insufficient mixing of exhaust gas at the exhaust gas sensor. Further, the exhaust gas sensor may not be able to reliably detect cylinder-to-cylinder imbalance during an engine cold-start condition due to insufficient warm-up of the exhaust gas sensor. As another example, when using exhaust manifold pressure to detect AFR imbalance, the detection may be affected by the distance between the pressure sensor and the cylinder. With increased distance, exhaust gas from other cylinders is more likely to mix with the exhaust gas from the cylinder under estimation. In other words, the reliability of any given imbalance diagnostic approach may vary based on operating conditions. Additionally, when using individual cylinder torque measurements for AFR imbalance detection, engines need to be equipped with additional hardware such as crankshaft torque sensors. As such, if fuel injection or throttle position is adjusted responsive to an indication of AFR imbalance during conditions when the sensor output is not reliable, further AFR and torque issues may be generated.

In one example, the issues described above may be at least partly addressed by a method comprising: during engine operation at stoichiometric air fuel ratio, indicating cylinder-to-cylinder imbalance in an engine cylinder based on a first sensed cylinder acceleration and a calibration profile for each cylinder, and confirming the indicated cylinder-to-cylinder imbalance based on one or more of an exhaust air-fuel ratio, an exhaust manifold pressure, and an individual cylinder torque. In this way, by using existing engine sensors to estimate cylinder accelerations of each engine cylinders, one or more cylinders with AFR imbalances may be individually identified.

As one example, during stoichiometric engine operation, cylinder calibration profiles (calibration profiles) may be generated for each cylinder over a plurality of engine speed-load conditions. Further cylinder calibration profiles may be generated for each cylinder operating at a plurality of richer than stoichiometric and leaner than stoichiometric AFR at a range of speed-load conditions. Prior to generation of the calibration profiles, the crankshaft acceleration sensor for each cylinder is calibrated and a tooth range for estimation of crankshaft acceleration is determined. In response to conditions for cylinder AFR imbalance detection being satisfied, cylinder acceleration values for each cylinder may be estimated at current speed-load conditions. The current cylinder acceleration for each cylinder may be compared to their calibration profile and a difference is estimated between the estimated acceleration and calibrated value. The difference may then be compared to threshold difference and an average difference (between estimated acceleration and calibrated value) for all other cylinders. If it is determined that the difference for one or more cylinders is higher than both the threshold difference and the average difference, the one or more cylinders may be indicated with AFR imbalance. Based on a positive or negative difference between the estimated acceleration and calibrated value, it may be identified if the one or more cylinders are leaner or richer than stoichiometry. The identified cylinders may be further confirmed by comparing acceleration values for the one or more identified cylinders to calibrated values at corresponding non-stoichiometric AFR. For each cylinder, AFR imbalance diagnostics may be carried out by combining one or more other imbalance detection methods such as using an UEGO sensor, EGO sensor, and/or crankshaft torque sensor. A confidence factor may be assigned to each cylinder for each method. Once one or more cylinders with AFR imbalance have been identified, mitigating actions, such as adjustments to fuel injection amounts to each cylinder, may be taken to maintain stoichiometric AFR.

By using existing engine sensors such as a crankshaft acceleration sensor, it is possible to identify one or more distinct engine cylinders with AFR imbalance without adding cost or complexity of additional sensors. By comparing accelerations amongst cylinders, it is possible to separate AFR imbalance from being erroneously detected as a misfire and decrease instances of undiagnosed imbalance. Also, for carrying out diagnostics for determining cylinder imbalance, engine operating conditions need not be modified and such diagnostics may be carried out during cold start conditions prior to UEGO warm-up. By using crankshaft acceleration sensor, degraded cylinder response caused by distant measuring locations of an exhaust pressure sensor and UEGO sensor may be averted. The technical effect of assigning confidence factors to each imbalance detection method for each cylinder is that imbalance for each cylinder may be accurately identified based on the method most suited for that cylinder. As such, the method allows shortcomings of any single estimation approach to be overcome, improving the overall accuracy and reliability of the cylinder imbalance estimation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the

DETAILED DESCRIPTION

Figure 1:
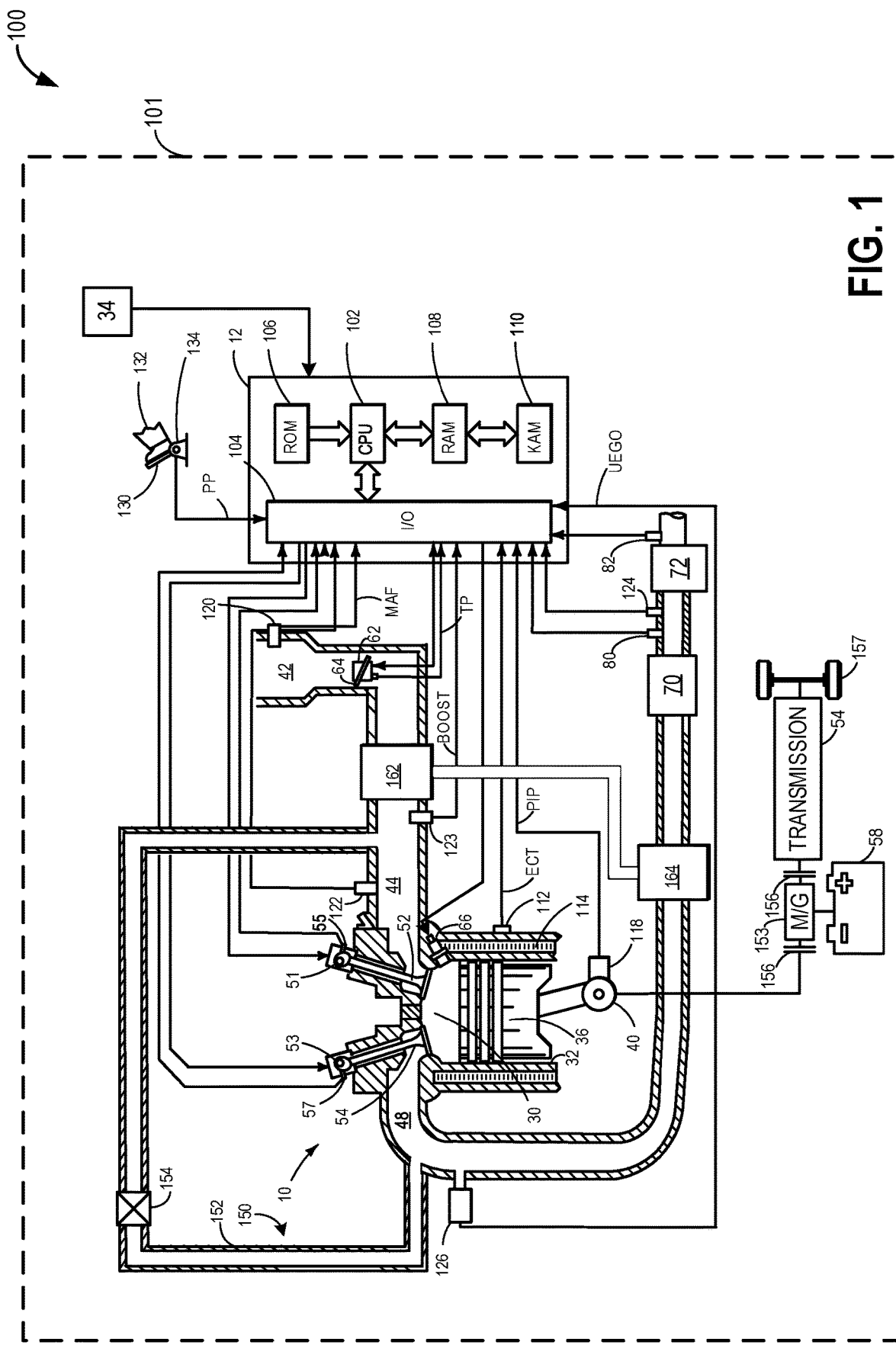
FIG. 1 shows a schematic depiction of an example engine system.
Figure 2:
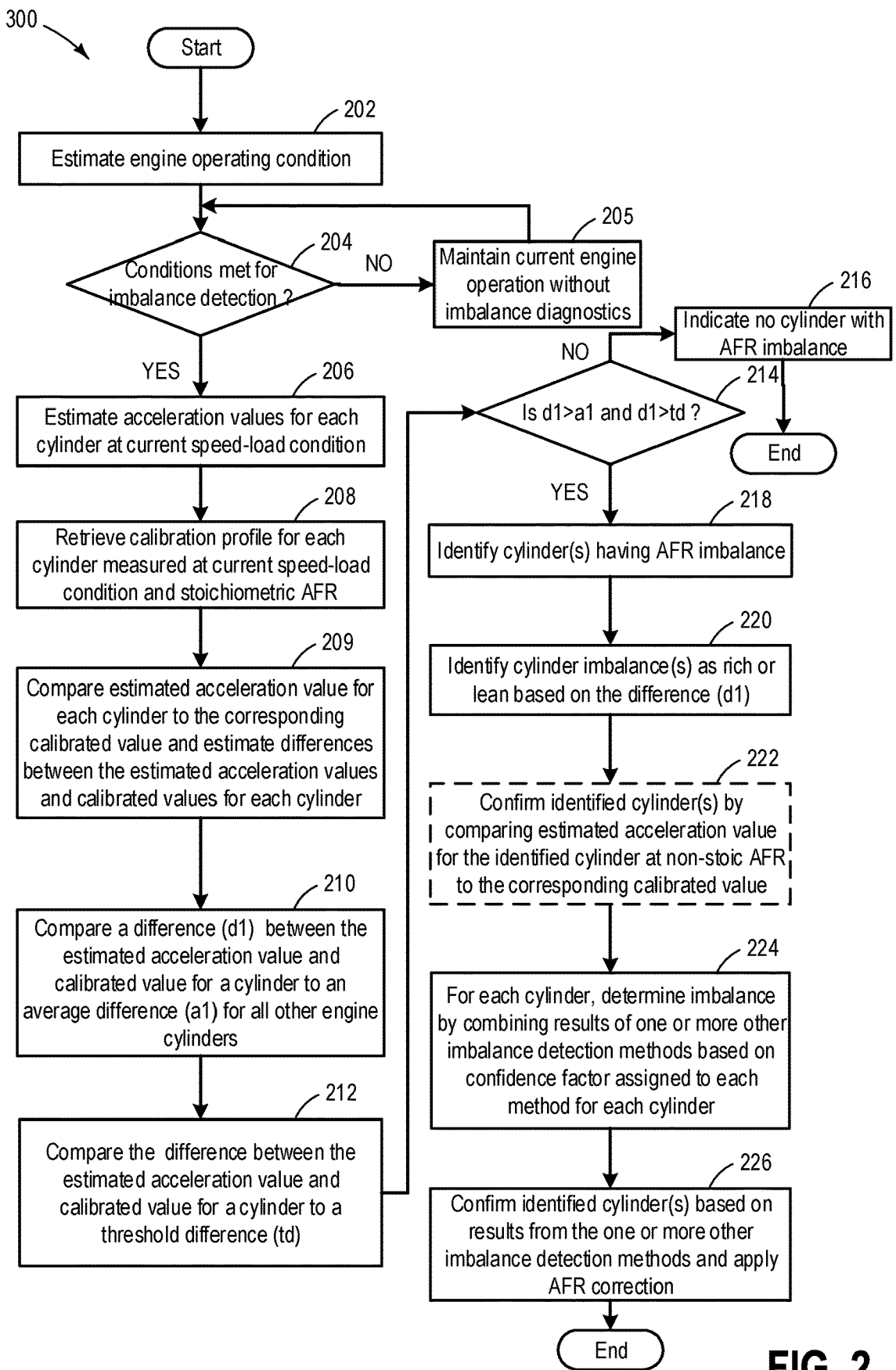
FIG. 2 shows an example method for identifying cylinder-to-cylinder imbalance.
Figure 4:
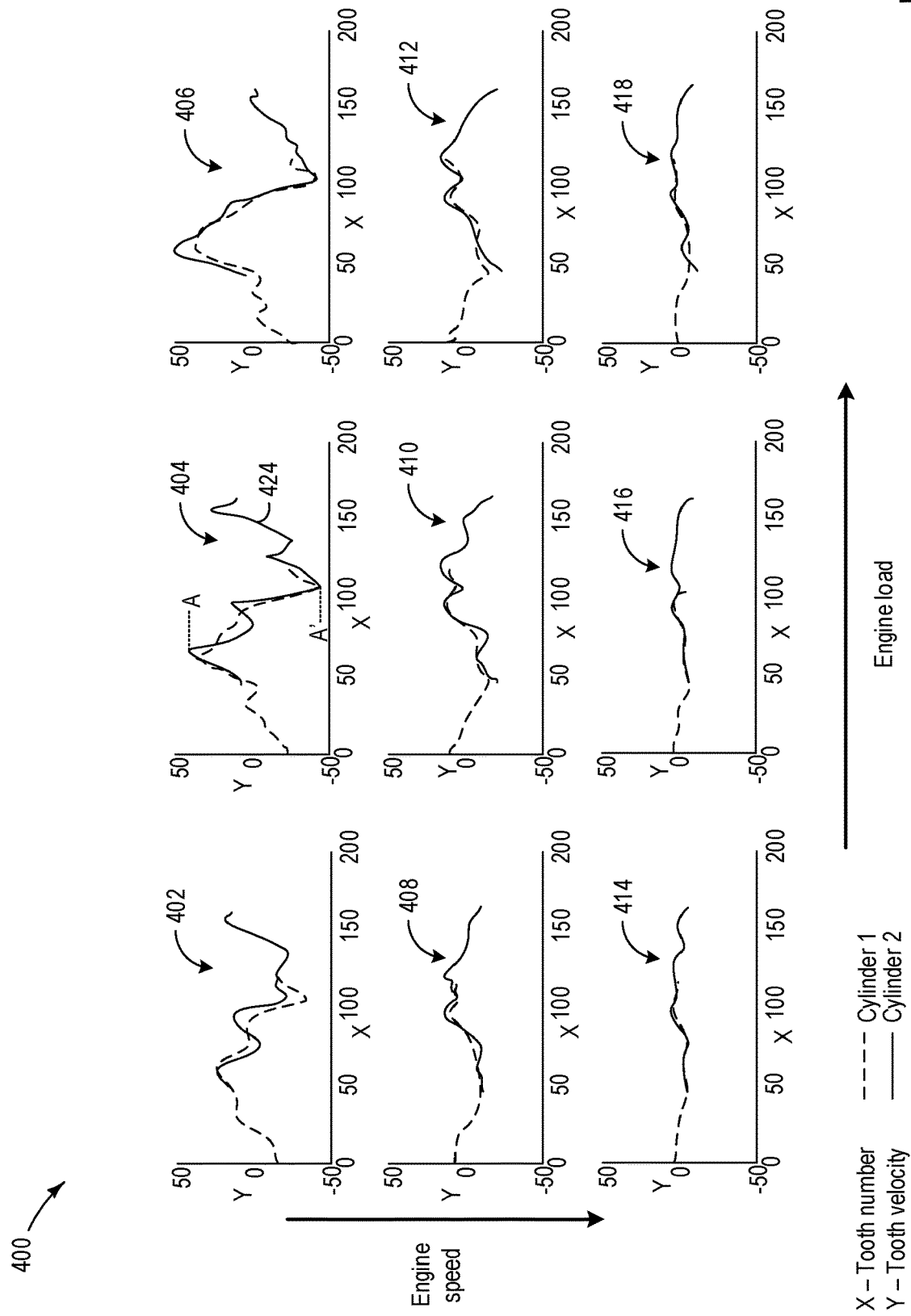
FIG. 4 shows plots for estimating cylinder accelerations at a plurality of engine speed-load conditions.
Figure 5:
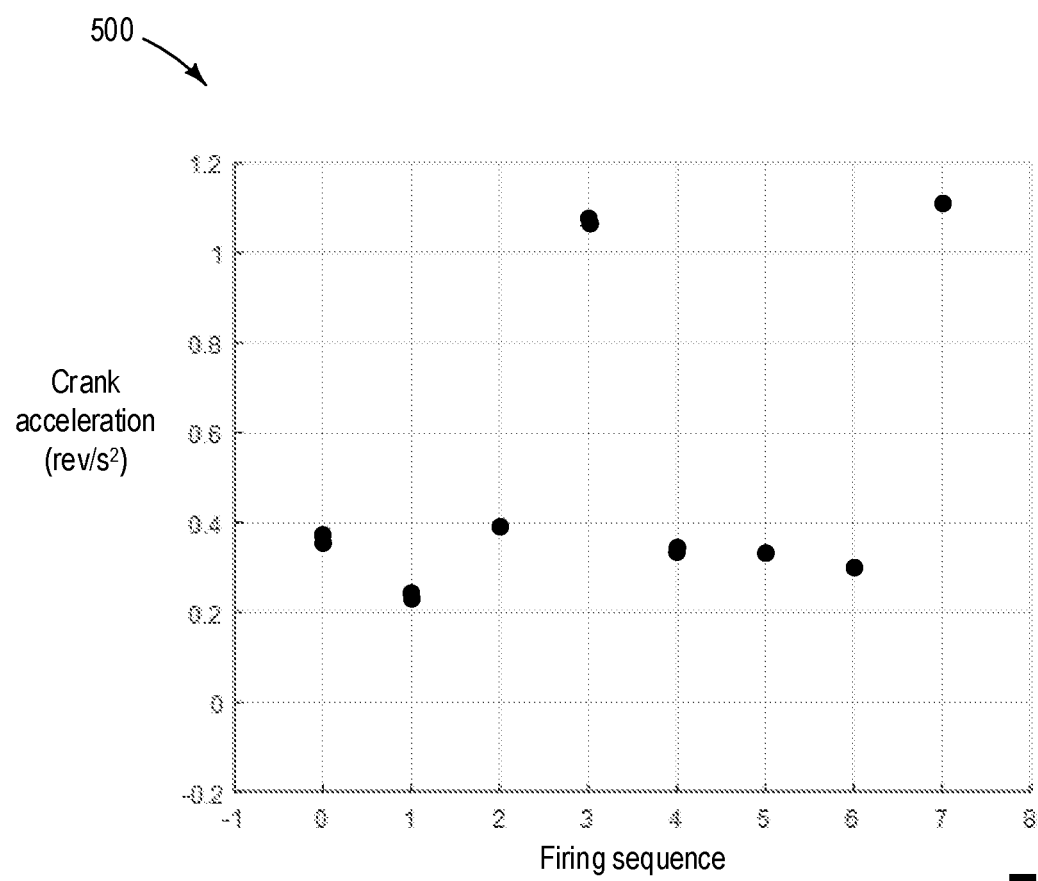
FIG. 5 shows a map of crankshaft acceleration for a single cylinder as estimated at stoichiometric AFR, over a range of engine speed-load conditions.
Figure 6:
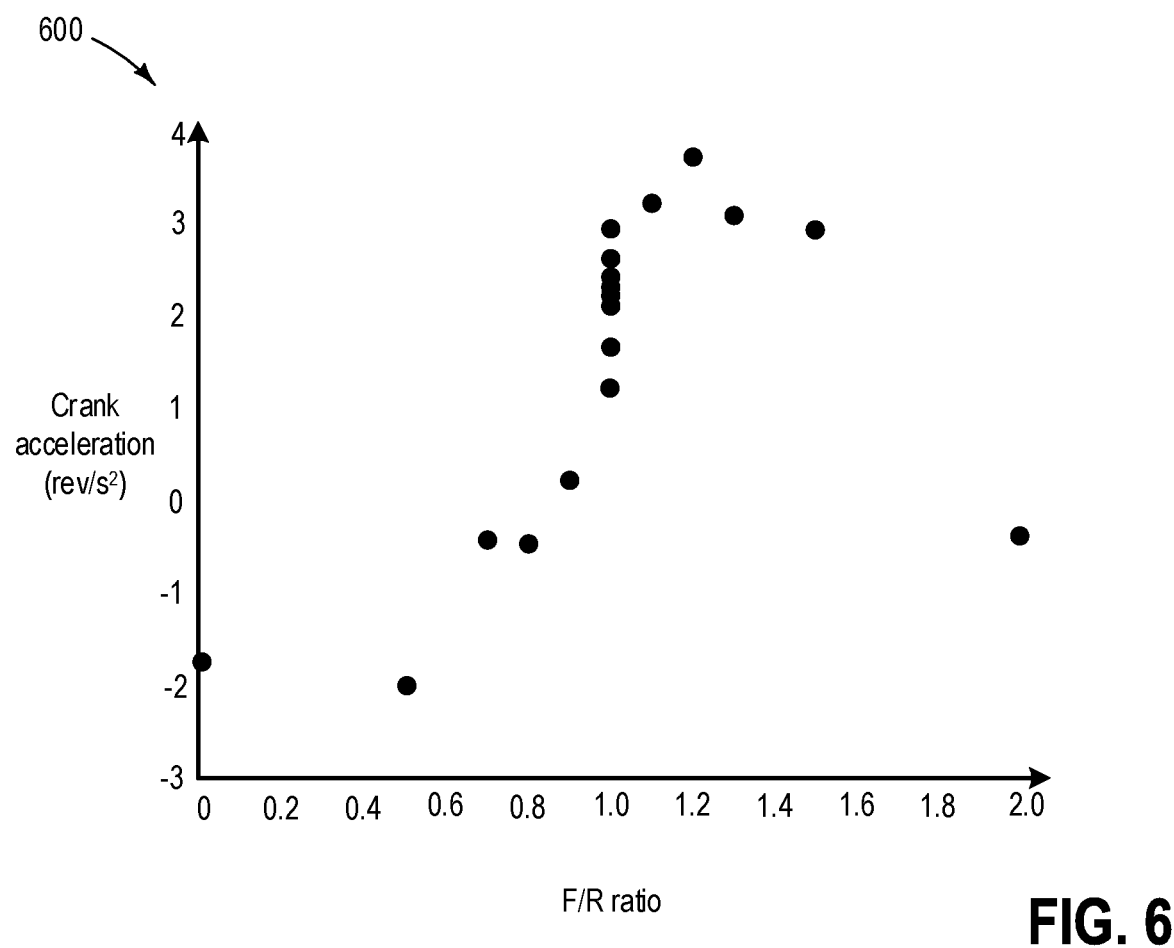
FIG. 6 shows a map of crankshaft acceleration for a first cylinder as estimated over a range of AFR.
Figure 7A:
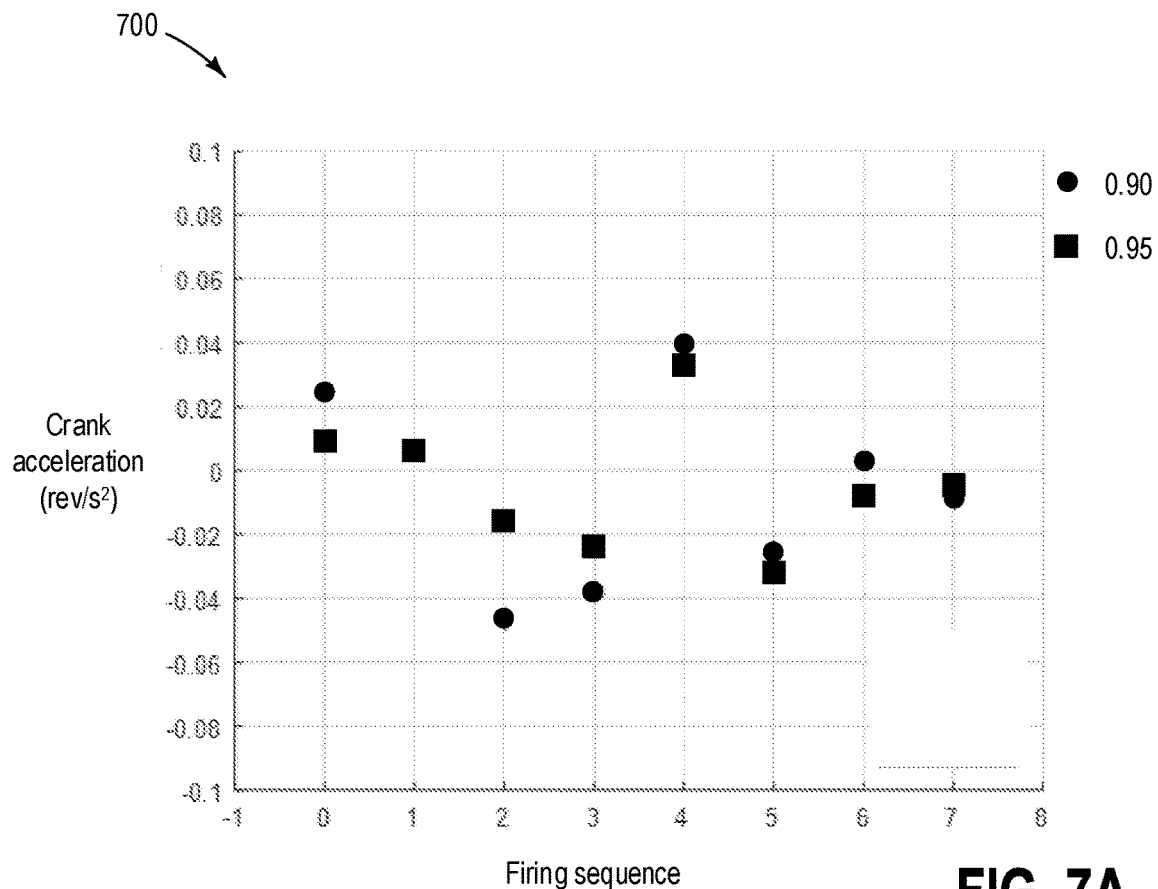
FIG. 7A shows a first plot indicating a difference between crankshaft accelerations estimated at stoichiometric AFR and a plurality of non-stoichiometric AFRs for a single cylinder.
Figure 7B:
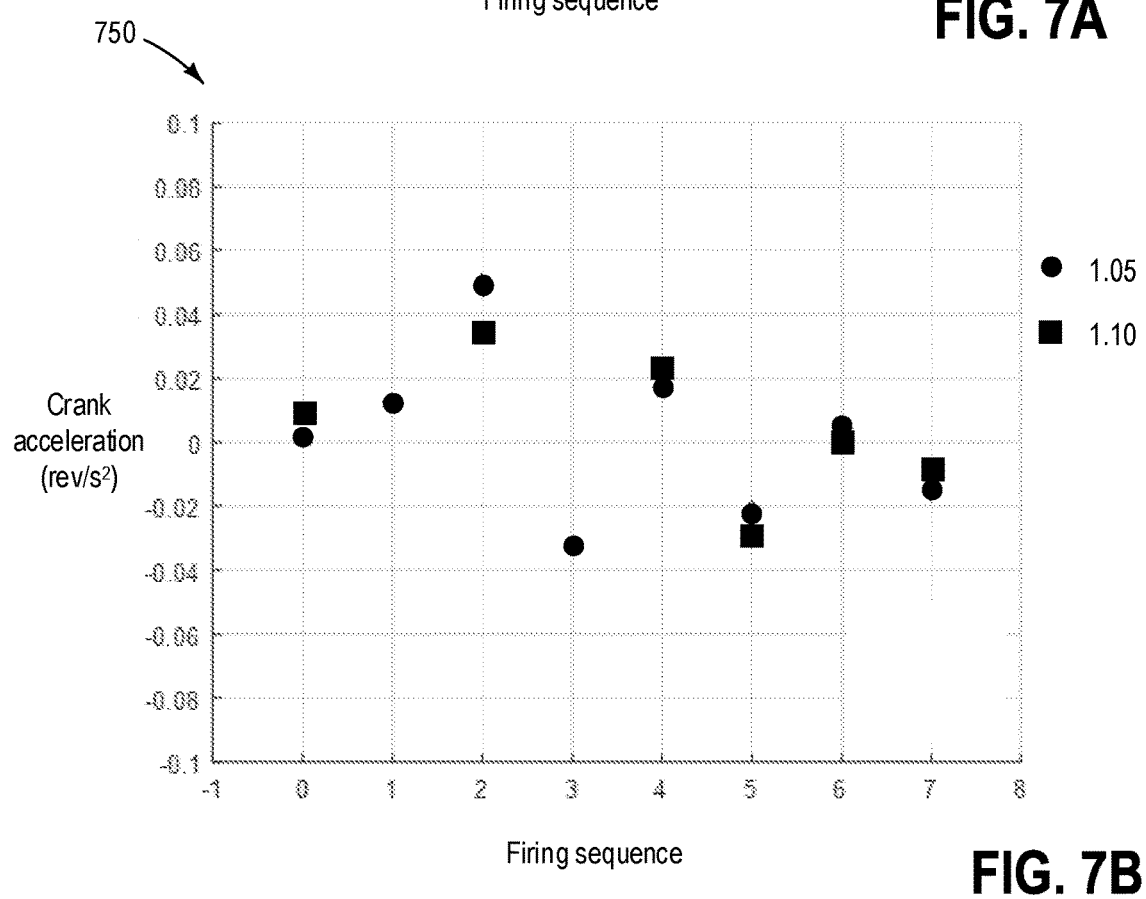
FIG. 7B shows a second plot indicating a difference between crankshaft accelerations estimated at stoichiometric AFR and a plurality of non-stoichiometric AFRs for a single cylinder.

The following description relates to systems and methods for identifying cylinder-to-cylinder imbalance in a vehicle using crankshaft acceleration. A cylinder-to-cylinder imbalance may be a difference in air-fuel ratio between cylinders when all engine cylinders are indented to operate at a uniform air-fuel ratio. FIG. 1 shows a schematic depiction of one cylinder in a multi-cylinder engine system. The engine system may comprise a crankshaft position sensor for sensing individual cylinder accelerations. An engine controller may be configured to perform a control routine, such as the example routines of FIG. 3, to calibrate the crankshaft acceleration sensor and generate calibration profiles for each cylinder during engine operation at different speed-load conditions. FIG. 4 shows example plots for estimated cylinder accelerations to be included in the calibration profiles for each cylinder. FIGS. 5-6 show example calibration profiles for individual cylinders. FIGS. 7A-7B show differences between crankshaft accelerations estimated at a plurality of non-stoichiometric AFRs and stoichiometric AFR for a single cylinder. FIG. 2 includes an example routine to identify cylinder-to-cylinder imbalance based on the sensed cylinder acceleration data.

Turning now to FIG. 1, a schematic diagram showing one cylinder of multi-cylinder internal combustion engine 10, which may be included in a propulsion system of vehicle 101, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

A crankshaft position sensor 118 (also referred herein as a crankshaft acceleration sensor and Hall effect sensor) may be coupled to the crankshaft 40 to estimate engine speed. The crankshaft position sensor 118 is positioned so that teeth on a reluctor ring attached to the crankshaft pass close to a sensor tip. The reluctor ring has one or more teeth missing to provide the controller with a reference point to the crankshaft 40 position. As an example, the reluctor ring may include 60 teeth with two missing teeth.

As the crankshaft 40 rotates, the sensor 118 may produce a pulsed voltage signal, where each pulse corresponds to a tooth on the reluctor ring. Acceleration of each cylinder may be estimated based on input from the crankshaft position sensor 118. During engine operation, cylinder-to-cylinder air-fuel ratio (AFR) imbalance may be estimated based on cylinder acceleration. Calibration profiles may be generated for each cylinder with cylinder acceleration values as estimated via the crankshaft position sensor 118 at a plurality of engine speed and load conditions with the engine operating at stoichiometric and non-stoichiometric air fuel ratios. Generation of calibration profiles is elaborated with relation to FIG. 3. During AFR diagnostics of the engine cylinders, crankshaft acceleration for each engine cylinder may be estimated over a compression stroke at the current engine speed and load condition with the engine operating at stoichiometric air fuel ratio. For each cylinder, crankshaft acceleration caused by the cylinder may be compared to a corresponding calibrated acceleration of the cylinder. The calibrated acceleration of the cylinder may be retrieved from the calibration profile for the cylinder, the calibrated acceleration estimated at the current engine speed and load condition with the engine operating at stoichiometric air fuel ratio. The cylinder may be indicated as imbalanced when a difference between the sensed cylinder acceleration and the calibrated acceleration is higher than a threshold difference, and when the difference is higher than an average difference for all other engine cylinders. The cylinder may be indicated to be operating at richer than stoichiometric AFR in response to the sensed cylinder acceleration being higher than the calibrated acceleration, or the cylinder may be indicated as operating at leaner than stoichiometric AFR in response to the sensed cylinder acceleration being lower than the calibrated acceleration. A degree of richness or leanness may be estimated based on the difference between the sensed cylinder acceleration and the calibrated acceleration. Details of a method for detecting cylinder-to-cylinder imbalance is described in relation to FIG. 2.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include fixed cam timing, or may include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail, which may be a common fuel rail.

Intake manifold 44 may include a throttle 62 having a throttle plate 64. However, in other examples, the throttle may be located in intake passage 42. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air and/or EGR provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

In this embodiment the engine is a diesel engine configured to combust diesel fuel (e.g. petroleum diesel or biodiesel) via compression ignition. Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or Universal Exhaust Gas Oxygen (UEGO) sensor, a two-state oxygen sensor or EGO, a HEGO (heated EGO), a $NO_x$, HC, or CO sensor.

Emission control device 70 is shown arranged along exhaust passage 48 downstream of exhaust gas sensor 126. Device 70 may include a diesel a selective catalytic reduction (SCR) catalyst which is capable of reducing NOx in an oxygen rich environment. A diesel oxidation catalyst (DOC) may also be coupled to the exhaust passage 48. At least one diesel particulate filter (DPF) 72 may be coupled downstream of the emission control device 70 in order to trap soot. The DPF may be manufactured from a variety of materials including cordierite, silicon carbide, and other high temperature oxide ceramics. Therefore, the DPF may be periodically regenerated in order to reduce the soot deposits in the filter so that flow resistance due to soot accumulation does not reduce engine performance.

A Catalyst Monitor Sensor (CMS) 80 which is also an oxygen sensor may be coupled downstream of the emission control device 70 in order to estimate operating efficiency of the emission control device 70. Further, an Exhaust Gas Oxygen (EGO) sensor 82 may be coupled downstream of the diesel particulate filter.

It should be appreciated that alternate emission control system configurations may be used in alternate embodiments. For example, emission control device 70 may be coupled downstream of the DPF. Further in other examples, a plurality of diesel particulate filters may be included in the emission control system. Each catalyst, filter, etc., may be enclosed within a single housing or alternatively may be enclosed via separate housings. It will be appreciated that numerous configurations are possible and the configuration depicted in FIG. 1 is exemplary in nature.

Engine 10 may further include a boost generating device such as a turbocharger or a supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 12. Further, a sensor 123 may be disposed in intake manifold 44 for providing a BOOST signal to controller 12.

Engine 10 may further include a high pressure EGR system 150. High pressure EGR system 150 includes an EGR conduit 152 coupled to the exhaust 48 upstream of turbine 164 and coupled to the intake 44 downstream of compressor 162. High pressure EGR system 150 may include an EGR valve 154 disposed along EGR conduit 152 to control exhaust flow through EGR system 150. Engine 10 may also include a low pressure EGR system. Low pressure EGR system includes an EGR conduit coupled to the exhaust downstream of turbine and coupled to the intake upstream of compressor. Low pressure EGR system may include an EGR valve disposed along EGR conduit to control exhaust flow through EGR system.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 and send control signals to a plurality of actuators 18 coupled to engine 10. In addition to those signals previously discussed, controller 12 may receive measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; absolute manifold pressure signal, MAP, from sensor 122; exhaust air fuel ratio from one or more of UEGO sensor 126, CMS 80, and EGO sensor 82. Engine speed signal, RPM, may be generated by controller 12 from signal PIP. Manifold pressure signal MAP from a manifold pressure sensor may be used to provide an indication of vacuum, or pressure, in the intake manifold. In addition to above mentioned sensors, the engine may further include exhaust temperature sensor, exhaust pressure sensor 124, crankshaft torque sensor, yaw sensor, etc.

Storage medium read-only memory 106 can be programmed with computer readable data representing instructions executable by processor 102 for performing the methods and control strategies described below as well as other variants that are anticipated but not specifically listed. In one example, the controller may determine air fuel ratio imbalance amongst cylinders based on inputs from one or more of crankshaft position sensor 118, UEGO sensor 126, CMS 80, and EGO sensor 82. As described above, FIG. 1 shows only one cylinder of a multi-cylinder engine; however it should be appreciated that each cylinder may similarly include its own set of intake/exhaust valves, fuel injector, spark plug, etc.

In some examples, vehicle 101 may be a hybrid vehicle with multiple sources of torque available to one or more vehicle wheels 157. In other examples, vehicle 102 is a conventional vehicle with only an engine, or an electric vehicle with only electric machine(s). In the example shown, vehicle 101 includes engine 10 and an electric machine 153. Electric machine 153 may be a motor or a motor/generator. Crankshaft of engine 10 and electric machine 153 are connected via a transmission 46 to vehicle wheels 157 when one or more clutches 156 are engaged. In the depicted example, a first clutch 156 is provided between crankshaft and electric machine 153, and a second clutch 156 is provided between electric machine 153 and transmission 46. Controller 12 may send a signal to an actuator of each clutch 156 to engage or disengage the clutch, so as to connect or disconnect crankshaft from electric machine 153 and the components connected thereto, and/or connect or disconnect electric machine 153 from transmission 46 and the components connected thereto. Transmission 46 may be a gearbox, a planetary gear system, or another type of transmission. The powertrain may be configured in various manners including as a parallel, a series, or a series-parallel hybrid vehicle.

Electric machine 153 receives electrical power from a traction battery 58 to provide torque to vehicle wheels 157. Electric machine 153 may also be operated as a generator to provide electrical power to charge traction battery 58, for example during a braking operation.

In this way, the components of FIG. 1 enables a controller with computer readable instructions stored on non-transitory memory to: during stoichiometric engine operation at an engine speed-load condition, estimate cylinder acceleration for each cylinder via a crankshaft position sensor, retrieve calibrated cylinder acceleration for each engine cylinder, the calibrated acceleration estimated during stoichiometric engine operation at the engine speed-load condition, for each cylinder, estimate a difference between estimated cylinder acceleration and calibrated acceleration, for each cylinder, estimate an average difference between estimated cylinder acceleration and calibrated acceleration for all other cylinders, and in response to the difference being higher than a threshold and the difference being higher than the average difference for a cylinder, indicate the cylinder as imbalanced.

Turning to FIG. 2, routine 200 depicts a method of identifying cylinder-to-cylinder imbalance based on input from a crankshaft acceleration sensor. Routine 200 further comprises adjusting engine operation in response to the identified cylinder-to-cylinder imbalance. Instructions for carrying out method 200 and the rest of the methods included herein may be executed by controller 12 based on instructions stored on memory of the controller and in conjunction with signals received from sensors of the engine system, such as the sensors described above with reference to FIG. 1. The controller may employ engine actuators of the engine system to adjust engine operation, according to the methods described below.

At 202, vehicle and engine operating conditions including vehicle speed, engine speed, engine load, engine temperature, EGR flow-rate, etc. may be estimated. Further ambient conditions including ambient temperature, ambient pressure, etc. may also be estimated.

At 204, the routine includes determining if conditions are met for cylinder-to-cylinder air fuel ratio (AFR) imbalance detection. An AFR imbalance monitor may be activated for carrying out detection of cylinder-to-cylinder AFR imbalance. In one example, the entry conditions may include a non-rough road condition. Road roughness conditions may be estimated based on inputs from a plurality of vehicle sensors. In one example, a road roughness index may be determined. The indication of road roughness may be based on one or more of crankshaft acceleration, a wheel speed sensor, a suspension sensor, a steering sensor, wheel slippage, and yaw. For example, one or more of crankshaft acceleration as measured by the crankshaft position sensor, vehicle wheel speed as estimated by the wheel speed sensor(s), steering movements as determined from the steering wheel sensor, angular velocity and slip-angle of the vehicle as measured by the yaw-rate sensor, and horizontal and vertical accelerations as measured by the acceleration sensors may be utilized in estimating road roughness conditions. Road roughness estimation may also be based on input from additional engine sensors. Alternatively, the indication of road roughness may be based on navigational input. In one example, the controller on-board the vehicle may include a navigation system (e.g., global positioning system) via which a location of the vehicle (e.g., GPS co-ordinates of the vehicle) may be transmitted to an external server over a network. Based on the location of the vehicle, local road roughness conditions for that location may be retrieved from the external server. Further still, the navigation system may be used to plan a vehicle route of travel and based on the planned route, road conditions for the entirely of the route may be retrieved. This may include receiving an estimate of regions of the planned route where the expected road roughness is higher (e.g., road roughness index is higher) and regions of the planned route where the expected road roughness is lower (e.g., road roughness index is lower).

In another example, the on-board vehicle controller may be communicatively coupled to the on-board controller of one or more other vehicles, such as using vehicle to vehicle (V2V) communication technology. The one or more other vehicles may include other vehicles within a threshold radius of the given vehicle and having the same make or model. Road roughness conditions may be retrieved from one or more vehicles within a threshold radius of the given vehicle. For example, a statistical or weighted average of the values retrieved from one or more vehicles may be used to estimate the road roughness conditions (or road roughness index). The road roughness condition/index as estimated by the controller may then be compared to a predetermined threshold value for roughness. A lower than threshold value for road roughness may allow activation of AFR imbalance monitor.

In another example, the entry conditions for activating AFR imbalance monitor may depend on engine operating conditions such as an engine temperature, engine load, engine speed, AFR, combinations thereof, etc. For example, if the engine is operating at a higher engine load, the air/fuel imbalance monitor may not be activated. In yet another example, the air/fuel imbalance monitor may not be activated if transient engine conditions, such as tip-ins, tip-outs, etc. are detected. In a further example, AFR imbalance monitoring may be carried out when the engine is being operated at a stoichiometric AFR. In an additional example, the monitoring of air/fuel imbalance may be scheduled to be performed at specific times or intervals, such as after a certain number of miles have been driven, etc.

If it is determined that conditions are not met for cylinder-to-cylinder AFR imbalance detection, at 205, current engine operation may be maintained without activation of the AFR imbalance monitor. The engine may be operated at a stoichiometric AFR.

If it is determined that conditions are met for cylinder-to-cylinder AFR imbalance detection, at 206, acceleration values for each engine cylinder may be estimated at current engine speed-load conditions via a crankshaft position sensor. During cylinder acceleration estimation, the engine may be operated at a stoichiometric AFR. As elaborated with reference to FIG. 3, a tooth range of the crankshaft position sensor is selected for estimation of acceleration values. In this example, for each cylinder, during a combustion stroke, tooth velocity of the crankshaft position sensor is estimated between tooth 60 and tooth 105. Acceleration for a cylinder is estimated as a function of a difference between a highest (peak) value of tooth velocity and a lowest (valley) value of peak velocity. As an example, for an eight cylinder engine, the controller may determine eight distinct cylinder acceleration values corresponding to each distinct cylinder operating at the current speed-load condition under a stoichiometric AFR.

At 208, a calibration profile for each cylinder measured at stoichiometric AFR may be retrieved from controller memory. The calibration profile for each cylinder may include a table/map of acceleration values with each value corresponding to an engine speed-load condition. As an example, the controller may retrieve eight distinct calibrated profiles from controller memory, each profile corresponding to one distinct cylinder. The controller may then retrieve a calibrated acceleration value for each cylinder corresponding to the current engine speed-load condition and a stoichiometric AFR from the corresponding calibration profile. As an example, for the eight cylinder engine, the controller may retrieve eight calibrated acceleration values with each value corresponding to one specific cylinder. A method for generation of the calibration profile is described in relation to FIG. 3.

At 209, the estimated acceleration value for each cylinder may be compared to the corresponding calibrated value and differences between the estimated acceleration value and the corresponding calibrated value for each cylinder may be estimated. As an example, the cylinder acceleration of the first cylinder (in an eight cylinder engine) may be compared to the calibrated acceleration value for the first cylinder (at the current speed-load condition) and a difference between the cylinder acceleration and the calibrated acceleration value may be estimated for the first cylinder. This step of comparison and difference estimation may be carried out for each cylinder.

At 210, for each cylinder, a difference (d1) between the estimated acceleration value and the corresponding calibrated value may be compared to an average difference (a1) for all other cylinders. As an example, for the first cylinder (eight cylinder engine), the difference (d1) between the estimated acceleration value and the corresponding calibrated value may be compared to an average difference (a1) between the estimated acceleration values and the corresponding calibrated values for the remaining seven cylinders. In one example, a root mean square difference between the estimated acceleration value and the corresponding calibrated value may be compared to an average root mean square difference (a1) for all other cylinders.

At 212, the difference (d1) between the estimated acceleration value and the corresponding calibrated value may be compared to a threshold difference (td). The threshold difference may correspond to an acceleration difference beyond which the specific cylinder may be identified as AFR imbalanced and if not corrected, the imbalance may adversely affect engine operations.

At 214, the routine includes determining if the difference (d1) between the estimated acceleration value and the corresponding calibrated value for a cylinder is greater than average difference (a1) for all other cylinders, and the difference (d1) between the estimated acceleration value and the corresponding calibrated value for a cylinder is greater than the threshold difference (td). This determination may be carried out for each engine cylinder. In this way, an imbalanced cylinder may be identified with reference to all cylinders in the engine. By using the effect of a cylinder imbalance with reference to all other engine cylinders, it is possible to distinguish between AFR imbalance and misfire in a cylinder.

If it is determined that for each cylinder, difference (d1) is lower than average difference (a1) and the difference (d1) is lower than the threshold difference (td), at 216, it may be indicated that none of the engine cylinders have AFR imbalance. Consequently, current engine operation may be maintained without any compensation for imbalance.

However, if it is determined that for one or more cylinders, difference (d1) is greater than average difference (a1) and the difference (d1) is higher than the threshold difference (td), at 218, the one or more cylinders may be identified as having AFR imbalance. At 220, the one or more cylinders having AFR imbalance may be identified as operating richer than stoichiometric or leaner than stoichiometric based on the difference (d1) between the estimated acceleration value and the corresponding calibrated value for identified cylinder(s). If the difference is negative then the imbalanced cylinder(s) may be identified to be operating leaner than stoichiometric and if the difference is positive then the imbalanced cylinder(s) may be identified to be operating richer than stoichiometric. A degree of richness or leanness (magnitude of AFR) may be estimated based on the difference (d1) between the estimated acceleration value and the corresponding calibrated value for identified cylinder(s). As an example, the controller may use a look-up table to determine the degree of richness or leanness with the difference (with positive or negative sign) as input and the degree of leanness or richness as output.

In order to optionally further confirm that the identified one or more cylinders are imbalanced, at 222, the estimated acceleration value for the identified cylinder(s) may be compared to the corresponding calibrated acceleration value for same cylinder(s) at non-stoichiometric AFR. A calibration (acceleration) profile for the identified cylinder(s) measured at non-stoichiometric AFR may be retrieved from controller memory. The calibration profile may include a table of acceleration value with each value corresponding to a non-stoichiometric AFR. The controller may retrieve a calibrated acceleration value cylinder(s) corresponding to the estimated degree of richness or leanness for the imbalanced cylinder. As an example, if cylinder one is identified to be operating at 1.2 (leaner than stoichiometric) AFR, the estimated acceleration value (estimated at stoichiometric engine operation) for the first cylinder may be compared to the calibrated acceleration value for the first cylinder corresponding to 1.2 AFR. The first cylinder may then be confirmed to be imbalanced if the estimated acceleration value for the first cylinder and the calibrated acceleration value for the first cylinder corresponding to 1.2 AFR are substantially equal (such as within 5% difference).

At 224, for each cylinder, AFR imbalance may be determined by combining results from one or more other imbalance detection methods based on confidence factors assigned to each method for each cylinder. The imbalance detection methods may include imbalance detection using one or more of an exhaust oxygen sensor such as an UEGO sensor, a CMS sensor, and/or an EGO sensor, cylinder torque sensor, and exhaust pressure sensor. For each cylinder i, exhaust air-fuel ratio $LAM_i$ is estimated by an exhaust gas sensor (such as exhaust gas sensor 126 of FIG. 1), exhaust manifold pressure $P_i$ is estimated by a pressure sensor (such as pressure sensor 124 of FIG. 1), and individual cylinder torque $TQ_i$ is estimated by a crankshaft torque sensor.

In one example, cylinder-to-cylinder AFR imbalance detection using exhaust oxygen sensor may include routing exhaust gas from one or more cylinders to an exhaust gas oxygen sensor, and indicating that air/fuel of at least one cylinder is imbalanced based on a response of the exhaust gas oxygen sensor at frequencies at or above firing frequency of the cylinder(s). Imbalance may be identified if the integration of high frequency differential signals detected by the oxygen sensor is higher than a threshold. In another example, AFR imbalance detection using exhaust pressure sensor may include routing exhaust gas from one or more cylinders at a time to an exhaust pressure sensor, and indicating that air/fuel of at least one cylinder is imbalanced based on a higher than threshold exhaust pressure. In yet another example, AFR imbalance detection using crankshaft torque sensor may include indicating air/fuel imbalance in a cylinder based on a lower than threshold torque as sensed via the crankshaft torque sensor.

For each cylinder i, based on the estimated operating conditions, confidence factors are determined for each AFR imbalance estimation. For each cylinder, a first confidence factor $c1$ may be determined for the AFR estimation; a second confidence factor $c2$ may be determined for the estimation of the exhaust manifold pressure; and a third confidence factor $c3$ may be determined for the estimation of the individual cylinder torque. As such, the confidence factor of a given estimation reflects the reliability or accuracy of a cylinder-to-cylinder imbalance estimate based on the given estimation for that cylinder. The confidence factor may be set to a highest value of 1.0 (indicating greatest confidence), or may be set to the lowest value of zero if the estimation is unavailable or not reliable. Further, the confidence factors may be set to any number between zero and one based on the cylinder and the operating condition at which the estimation is performed. A higher confidence factor value indicates that the imbalance estimate is more reliable, while a lower confidence factor value indicates that the imbalance estimate is less reliable. As such, the confidence factor of a given estimation method for a given cylinder may vary based on the operating conditions under which the estimation was carried out. For each cylinder, the confidence factors may also be adjusted while keeping the sum of the confidence factors at a constant value, so that measurements between different drive cycles may be compared.

As an example, for each cylinder, the first confidence factor $c1$ for the AFR estimation may be decreased when the mixing of exhaust gas at the exhaust gas sensor is below a threshold. In one embodiment, insufficient mixing may be estimated by observing whether an AFR change in certain cylinders may be reflected by the reading of the exhaust gas sensor, for example, during enleanment or fuel cut. The exhaust gas sensor may not have the same sensitivity to all cylinders, because the exhaust gas sensor may be in a location in the exhaust stream that always receives exhaust gas from some cylinders, but not exhaust gas from the other cylinders. Therefore, for each cylinder the first confidence factor may be different. As another example, the first confidence factor $c1$ may be decreased during engine cold-start conditions, because AFR may not be accurately estimated by the exhaust gas sensor due to insufficient warm-up of the exhaust gas sensor. As another example, the first confidence factor $c1$ may be decreased when the exhaust temperature is lower than a threshold. As yet another example, the confidence factor $c1$ may be decreased for the exhaust AFR measured within a predetermined time period after the engine cold start (or a predetermined number of combustion events since a first combustion event of the cold-start). In another example, the first confidence factor $c1$ may be decreased if the exhaust AFR is estimated during fuel type adjustment (such as when transitioning between a gasoline fuel and an ethanol fuel, or when transitioning from delivering fuel from a first fuel tank to a second fuel tank) or when the fuel type is unknown. Because exhaust AFR cannot be robustly calculated without information of the fuel type, less confidence is given to the first confidence factor $c1$ when the fuel composition cannot be reliably estimated.

In another example, for a cylinder, the second confidence factor $c2$ for the estimation of exhaust manifold pressure may be inversely proportional to distance between the pressure sensor and the exhaust valve of the cylinder. The farther the pressure sensor is from the cylinder, the greater chance that exhaust from other cylinders may mix with the exhaust from the cylinder under estimation, reducing the accuracy of measurement. In another example, the second confidence factor may be decreased if the variation of valve timing is within a threshold.

As another example, for each cylinder, the third confidence factor $c3$ for the estimation of the individual cylinder torque may be increased if the engine is in lean operation. As a further example, the third confidence factor may be increased when the first and the second confidence factors are decreased. Based on current engine operating conditions, for each cylinder, the three confidence factors may be determined corresponding to each of the imbalance detection methods (AFR estimation via exhaust oxygen sensor, exhaust manifold pressure estimation, and individual cylinder torque estimation) by using a look-up table wherein the current operating conditions may be used an inputs and the confidence factors may be the outputs.

A combined imbalance parameter may be estimated for each cylinder as a function of the confidence factors and imbalance detection via each method. In one example, for an engine cylinder (i), the combined imbalance parameter may be given by equation 1.

$$IP_i = f(c_1 LAM_i, c_2 P_i, c_3 TQ_i) \qquad (1)$$

where $IP_i$ is the combined imbalance parameter for cylinder i, $c_1$ is the first confidence factor, $LAM_i$ is the cylinder exhaust air-fuel ratio as estimated by an exhaust gas sensor (such as exhaust gas sensor 126 of FIG. 1), $P_i$ is the exhaust manifold pressure as estimated by a pressure sensor, and $TQ_i$ is the individual cylinder torque as estimated by a crankshaft torque sensor.

As an example, one or more imbalanced cylinders may be confirmed to be imbalanced if the deviation of combined imbalance parameter for any of the cylinder from a mean of the combined imbalance parameter for all cylinders is greater than a predetermined threshold. The magnitude of the deviation may correspond to the magnitude of the imbalance, and the sign of the deviation may correspond to the direction of the imbalance. For example, if the combined imbalance parameter for a cylinder is lower than the mean of the combined imbalance parameters (a negative deviation), the cylinder may be considered a rich outlier. As another example, if the combined imbalance parameter for a cylinder is higher than the mean of the combined imbalance parameters (a positive deviation), the cylinder may be considered a lean outlier.

At 226, the cylinder identified (at step 218) to be imbalanced may be confirmed based on the results from the one or more imbalance detection methods described in step 224. The cylinder(s) identified to be imbalanced based on crankshaft acceleration values may be confirmed to be imbalanced based on a higher than threshold deviation of the combined imbalance parameter for the cylinder from the mean of the combined imbalance parameter for all cylinders.

In response to detection of imbalance in one or more cylinder(s), a diagnostic code may be set indenting the cylinder(s). An AFR correction may be applied to the one or more cylinders which have been indicated as imbalanced. For example, an AFR correction may be applied to an identified cylinder(s) based on the identified magnitude and direction of air-fuel imbalance in the identified cylinder(s). For example, the controller may adjust the amount of fuel supplied to cylinders which have been identified as potentially imbalanced. Controller may then continue to monitor air-fuel imbalances in an attempt to correct the air/fuel imbalance in the identified cylinders. A fuel injector pulse width of a fuel injector actuator of the fuel injector for the imbalanced cylinder may be adjusted to provide the corrected fuel injection amount.

In this way, during calibration, generating distinct calibration profiles for each engine cylinder including cylinder acceleration values estimated at a plurality of engine speed and load conditions with the engine operating at one or more air-fuel ratios, during cylinder-to-cylinder imbalance diagnostics, estimating distinct cylinder acceleration values for each engine cylinder at an engine speed-load condition and stoichiometric air-fuel ratio, and indicating a cylinder as imbalanced based on an estimated cylinder acceleration value for the cylinder and corresponding calibration values for each engine cylinder.

Figure 3:
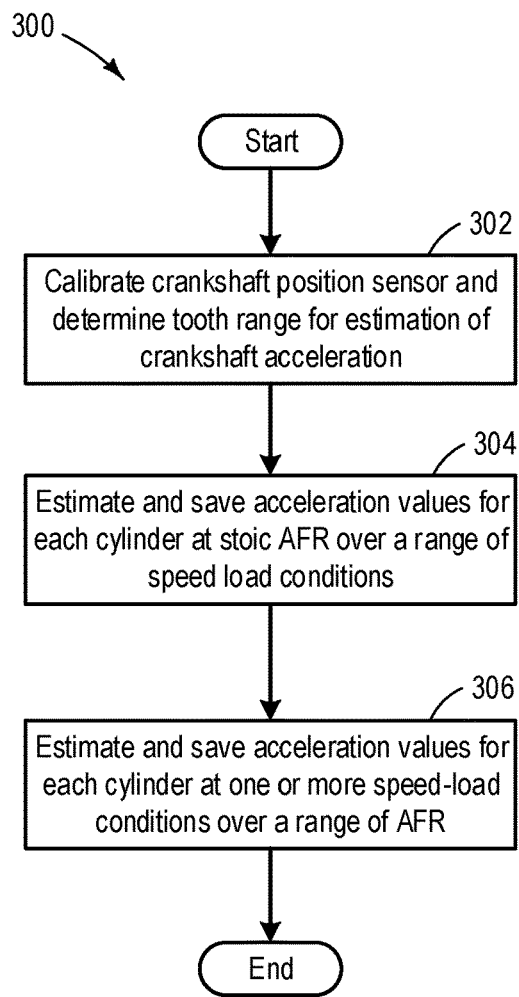
FIG. 3 shows an example method for calibration of a crankshaft acceleration sensor and subsequent generation of cylinder calibration profiles.

FIG. 3 shows an example method for calibration of a crankshaft acceleration sensor and subsequent generation of cylinder calibration profiles. At 302, calibration of the crankshaft position sensor and determination of tooth range for estimation of crankshaft acceleration may be carried out. The calibration method includes collecting crank position data from the crank position sensor of an engine at a defined sampling rate. In one example, sensor output is collected at ~8 Mhz from the crank position sensor. On a 60-2 crank wheel, this gives reliable velocity of each tooth as it passes the crank position sensor with as resolution of 6 crank degrees. Collecting the data further includes, collecting crank position data over a range of engine speeds and loads, and storing the data as a function of engine speed and load for each cylinder. For example, crank position data may be collected as the engine speed and load varies over a duration of the calibration procedure. The crank position data is converted into tooth velocities by crank position processing low level drivers. The tooth velocities may change as the piston moves to/from top dead center (TDC) and BDC.

After correcting the data, the method includes identifying, for a given cylinder, the tooth periods having a highest difference in velocity for each engine speed-load setpoint. As an example, a tooth range of tooth 60 to tooth 105 may be identified for collection of crankshaft acceleration data. Herein, the calibration is performed for several data points (e.g., at least more than a threshold number of data points, such as nine data points) across the engine speed and load table. An example, calibration performed over nine engine speed load conditions is shown in FIG. 4.

FIG. 4 shows a map 400 for estimating cylinder accelerations at a plurality of engine speed-load conditions. For each plot, the x-axis denotes tooth number and the y-axis denotes tooth velocity. The dashed line shows tooth velocity for a first cylinder (cylinder 1) while the solid line shows tooth velocity for a second cylinder (cylinder 2). The engine load is lowest for the first plot 402, the fourth plot 408, and the seventh plot 414, and the engine load is highest for the third plot 406, the sixth plot 412, and the ninth plot 418. Engine speed is lowest for the first plot 402, the second plot 404, and the third plot 406, and the engine speed in highest for the seventh plot 414, the eighth plot 416, and the ninth plot 418. The engine is operated in a mid-speed-load condition during generation of fifth plot 410.

For a given plot, cylinder acceleration may be estimated during the combustion stroke based on a difference in teeth velocity between a peak and a valley. As an example, for the second plot 404, cylinder acceleration for the second cylinder is estimated based on a difference between the points A and A' as shown on the plot 404, point A corresponding to the peak and point A' corresponding to a valley of the velocity curve 424.

Returning to FIG. 3, at 304, acceleration values for each cylinder may be estimated over a range of speed-load conditions when the engine is operating at a stoichiometric air fuel ratio. The acceleration estimation may be carried out during the combustion stroke in tooth range of tooth 60 to tooth 105. Each acceleration value may be used to populate a map of acceleration values for each cylinder corresponding to stoichiometric AFR at a range of engine speed-load conditions. In one example, each cylinder may have a separate map with acceleration values corresponding to a plurality of engine speed-load conditions when the engine is operating at stoichiometric AFR. The acceleration values (in the form of maps) for each cylinder may be saved in the controller memory and may be retrieved during cylinder-to-cylinder AFR imbalance detection.

In this way, in an example cylinder's 4 stroke cycle, the maximum tooth velocity and the minimum tooth velocity (maximum tooth velocity may occur at end of power stroke and minimum tooth velocity may occur at peak compression before power stroke) may be determined. The acceleration between those the minimum tooth velocity and the maximum tooth velocity may be estimated as the crank acceleration from that cylinder. The crank acceleration determination process may be repeated foe engine operating at a plurality of speed-load conditions and air-fuel ratios.

FIG. 5 shows an example map 500 of crankshaft acceleration for a each engine cylinder as estimated at a specific engine speed-load condition with the engine operating at stoichiometric AFR. The x-axis denotes a firing order (sequence) of each cylinder and the y-axis denotes crankshaft acceleration (in revolutions/seccond$^2$). Each point in the map may correspond to cylinder acceleration as estimated via a crankshaft acceleration sensor (such as crankshaft acceleration sensor 118 in FIG. 1) at the specific engine speed-load condition for a specific cylinder. For each cylinder, multiple acceleration measurements may be carried out at the specific engine speed-load condition with the engine operating at stoichiometric AFR. In this example, eight cylinders are shown with a sequential firing order. As seen from the map, amongst cylinders, the crankshaft acceleration may vary based even at the same engine speed-load conditions. In this example, the fourth and the eighth cylinders may have higher crankshaft acceleration relative to other engine cylinders.

Returning to FIG. 3, at 306, acceleration values for each cylinder may be estimated at one or more engine speed-load conditions over a range of AFRs. The acceleration estimation may be carried out during the combustion stroke of the cylinder in tooth range of tooth 60 to tooth 105. Each acceleration value may be used to populate a map of acceleration values for each cylinder corresponding to an AFR sweep at a specific engine speed-load condition. In one example, each cylinder may have a separate map with acceleration values corresponding to an AFR sweep carried out at a specific engine speed-load condition. The acceleration values (in the form of maps) for each cylinder may be saved in the controller memory and may be retrieved during cylinder-to-cylinder AFR imbalance detection. Each cylinder may have multiple AFR sweep maps with each map corresponding to a different engine speed-load condition.

FIG. 6 shows a first example map 600 of crankshaft acceleration for a first engine cylinder as estimated at a specific engine speed-load condition, over a range of fuel-air ratios (F/A ratio sweep). The x-axis denotes fuel-air ratio at which the engine is operated and the y-axis denotes crankshaft acceleration (in revolutions/seccond$^2$). Each point on the map may correspond to cylinder acceleration as estimated via a crankshaft acceleration sensor (such as crankshaft acceleration sensor 118 in FIG. 1) at a specific fuel-air ratio. As seen from the map, the crankshaft acceleration for a cylinder may vary based on the engine fuel-air ratio. The cylinder acceleration values may be lower at lower fuel-air ratio and the acceleration values may be higher at higher fuel-air ratio.

In this way, calibration maps may be generated for each cylinder corresponding to different engine speed-load conditions and fuel-air ratios. These maps may be used as references during diagnostics of cylinder-to-cylinder AFR imbalance.

FIG. 7A shows a first plot 700 of difference between crankshaft accelerations estimated at stoichiometric AFR and a plurality of leaner than stoichiometric AFRs for each engine cylinder with the engine operating at a specific engine speed-load condition. FIG. 7B shows a second plot 750 of difference between crankshaft accelerations estimated at stoichiometric AFR and a plurality of richer than stoichiometric AFRs for each engine cylinder with the engine operating at a specific engine speed-load condition. The x-axis denotes a firing order (sequence) of each cylinder and the y-axis denotes crankshaft acceleration (in revolutions/seccond$^2$). In the plot 700, differences in acceleration between engine operations at stoichiometric fuel-air ratio and 0.9 and 0.95 fuel-air ratio, respectively, is shown. In the plot 750, differences in acceleration between engine operations at stoichiometric fuel-air ratio and 1.05 and 1.1 fuel-air ratio, respectively, is shown. Each point in the maps may correspond to a difference in cylinder acceleration between engine operation at stoichiometric AFR and a non-stoichiometric AFR for each cylinder at a specific engine speed-load condition. As observed from the plots, the differences in acceleration between stoichiometric operation and richer than stoichiometric operation are positive for most engine cylinders and the differences in acceleration between stoichiometric operation and leaner than stoichiometric operation are negative for most engine cylinders.

The technical effect of comparing cylinder acceleration values for all engine cylinders to detect air-fuel ratio imbalance in one or more engine cylinders is that natural differences between acceleration of cylinders is not misinterpreted as imbalance and robustness of the diagnostic method may be improved. By combining results from a plurality of imbalance detection methods and using distinct confidence factors for each cylinder, shortcomings of any single estimation approach pertinent to a specific cylinder may be overcome, improving the overall accuracy and reliability of the cylinder imbalance estimation.

An example method for an engine comprises: during engine operation at stoichiometric air fuel ratio, indicating cylinder-to-cylinder imbalance in an engine cylinder based on a first sensed cylinder acceleration and a calibration profile for each cylinder, and confirming the indicated cylinder-to-cylinder imbalance based on one or more of an exhaust air-fuel ratio, an exhaust manifold pressure, and an individual cylinder torque. In any preceding example, the method further comprises, additionally or optionally, populating the calibration profile for each cylinder with cylinder acceleration values estimated via a crankshaft position sensor at a plurality of engine speed and load conditions with the engine operating at stoichiometric air fuel ratio. In any or all of the preceding examples, the method further comprising, additionally or optionally, populating another calibration profile for each cylinder with cylinder acceleration values estimated via the crankshaft position sensor at one or more engine speed and load conditions with the engine operating at a plurality of air fuel ratios. In any or all of the preceding examples, the method further comprising, additionally or optionally, sensing crankshaft acceleration for each engine cylinder over a compression stroke at an engine speed and load condition, and wherein indicating based on the first sensed cylinder acceleration and the calibration profile for each cylinder includes comparing the first sensed crankshaft acceleration of the cylinder to a first calibrated acceleration of the cylinder, and wherein the first calibrated acceleration of the cylinder is retrieved from the calibration profile, the first calibrated acceleration estimated at the engine speed and load condition with the engine operating at stoichiometric air fuel ratio. In any or all of the preceding examples, additionally or optionally, the indicating is further based on each of a difference between the first sensed cylinder acceleration and the first calibrated acceleration being higher than a threshold difference, and the difference being higher than an average difference for all other engine cylinders. In any or all of the preceding examples, additionally or optionally, the average difference is estimated based on differences between sensed cylinder accelerations and corresponding calibrated accelerations for each of the all other engine cylinders and a number of the all other engine cylinders. In any or all of the preceding examples, the method further comprising, additionally or optionally, indicating the cylinder as operating at richer than stoichiometric air fuel ratio (AFR) in response to the first sensed cylinder acceleration being higher than the first calibrated acceleration, or indicating the cylinder as operating at leaner than stoichiometric AFR in response to the first sensed cylinder acceleration being lower than the first calibrated acceleration. In any or all of the preceding examples, additionally or optionally, the confirming is further based on the first sensed cylinder acceleration being equal to a second calibrated acceleration of the cylinder, the second calibrated acceleration estimated at the engine speed and load condition with the engine operating at non-stoichiometric air fuel ratio, and wherein the second calibrated acceleration is retrieved from the another calibration profile. In any or all of the preceding examples, additionally or optionally, confirming based on the exhaust air-fuel ratio includes confirming based on the exhaust air-fuel ratio weighted by a first confidence factor, confirming based on the exhaust manifold pressure includes confirming based on the exhaust pressure weighted by a second confidence factor, and confirming based on individual cylinder torque includes confirming based on the individual cylinder torque weighted by a third confidence factor. In any or all of the preceding examples, additionally or optionally, the exhaust air-fuel ratio is estimated via an exhaust gas sensor, wherein the exhaust manifold pressure is estimated via a pressure sensor, and wherein the individual cylinder torque is estimated via a crankshaft torque sensor. In any or all of the preceding examples, additionally or optionally, one or more of the first, the second, and the third confidence factors are adjusted for each cylinder based on engine operating conditions. In any or all of the preceding examples, additionally or optionally, adjusting based on engine operations include, for an engine cylinder, decreasing the first confidence factor during engine warm-up after a cold start, decreasing the second confidence factor with increased distance between the pressure sensor and the engine cylinder, and increasing the third confidence factor during leaner than stoichiometric engine operation. In any or all of the preceding examples, the method further comprising, additionally or optionally, in response to the indication, applying an air-fuel ratio correction to the imbalanced cylinder, the air-fuel ratio correction including a corrected fuel injection amount, wherein a fuel injector pulsewidth of a fuel injector actuator is adjusted to provide the corrected fuel injection amount.

Another example method for an engine, comprises: during calibration, generating distinct calibration profiles for each engine cylinder including cylinder acceleration values estimated at a plurality of engine speed and load conditions with the engine operating at one or more air-fuel ratios, during cylinder-to-cylinder imbalance diagnostics, estimating distinct cylinder acceleration values for each engine cylinder at an engine speed-load condition and stoichiometric air-fuel ratio, and indicating a cylinder as imbalanced based on an estimated cylinder acceleration value for the cylinder and corresponding calibration values for each engine cylinder. In any preceding example, additionally or optionally, the corresponding calibration values for each cylinder are retrieved from the distant calibration profiles for each cylinder, the corresponding calibration values generated during engine operation at the engine speed-load condition and stoichiometric air-fuel ratio. In any or all of the preceding examples, the method further comprising, additionally or optionally, for each cylinder, estimating a difference between the estimated distinct cylinder acceleration value and the corresponding calibration value, and wherein the cylinder is indicated imbalanced in response to a difference between the estimated cylinder acceleration value for the cylinder and the corresponding calibration value for the cylinder being higher than a threshold and the difference being higher than an average difference for all other cylinders. In any or all of the preceding examples, the method further comprising, additionally or optionally, estimating an air-fuel ratio at the imbalanced cylinder based on the difference, and confirming the indication of imbalance based on the estimated cylinder acceleration value for the cylinder being equal to another corresponding calibration value, the another corresponding calibration value retrieved from the distinct calibration profiles for each cylinder, the another corresponding calibration value generated during engine operation at the engine speed-load condition and the air-fuel ratio at the imbalanced cylinder.

Yet another example engine system, comprises: a plurality of cylinders; and a controller with computer readable instructions stored on non-transitory memory that when executed cause the controller to: during stoichiometric engine operation at an engine speed-load condition, estimate cylinder acceleration for each cylinder via a crankshaft position sensor, retrieve calibrated cylinder acceleration for each engine cylinder, the calibrated acceleration estimated during stoichiometric engine operation at the engine speed-load condition, for each cylinder, estimate a difference between estimated cylinder acceleration and calibrated acceleration, for each cylinder, estimate an average difference between estimated cylinder acceleration and calibrated acceleration for all other cylinders, and in response to the difference being higher than a threshold and the difference being higher than the estimated average difference for a cylinder, indicate the cylinder as imbalanced. In any preceding example, additionally or optionally, the controller includes further instructions to: confirm the indicating based on an estimated exhaust air-fuel ratio weighted by a first confidence factor, an exhaust pressure weighted by a second confidence factor, and an individual cylinder torque weighted by a third confidence factor, the exhaust air-fuel ratio estimated via an exhaust gas sensor, the exhaust manifold pressure estimated via a pressure sensor, and the individual cylinder torque estimated via a crankshaft torque sensor. In any or all of the preceding examples, additionally or optionally, each of the first confidence factor, the second confidence factor, and the third confidence factor are calibrated for each cylinder based on engine temperature and engine speed-load condition.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during engine operation at stoichiometric air fuel ratio, indicating cylinder-to-cylinder imbalance in an engine cylinder based on a first sensed cylinder acceleration and a calibration profile for each cylinder, and confirming the indicated cylinder-to-cylinder imbalance based on one or more of an exhaust air-fuel ratio, an exhaust manifold pressure, and an individual cylinder torque.

2. The method of claim 1, further comprising, populating the calibration profile for each cylinder with cylinder acceleration values estimated via a crankshaft position sensor at a plurality of engine speed and load conditions with the engine operating at stoichiometric air fuel ratio.

3. The method of claim 2, further comprising, populating another calibration profile for each cylinder with cylinder acceleration values estimated via the crankshaft position sensor at one or more engine speed and load conditions with the engine operating at a plurality of air fuel ratios.

4. The method of claim 1, further comprising, sensing crankshaft acceleration for each engine cylinder over a compression stroke at an engine speed and load condition, and wherein indicating based on the first sensed cylinder acceleration and the calibration profile for each cylinder includes comparing a first sensed crankshaft acceleration of the cylinder to a first calibrated acceleration of the cylinder, and wherein the first calibrated acceleration of the cylinder is retrieved from the calibration profile, the first calibrated acceleration estimated at the engine speed and load condition with the engine operating at stoichiometric air fuel ratio.

5. The method of claim 4, wherein the indicating is further based on each of a difference between the first sensed cylinder acceleration and the first calibrated acceleration being higher than a threshold difference, and the difference being higher than an average difference for all other engine cylinders.

6. The method of claim 5, wherein the average difference is estimated based on differences between sensed cylinder accelerations and corresponding calibrated accelerations for each of the all other engine cylinders and a number of the all other engine cylinders.

7. The method of claim 4, further comprising, indicating the cylinder as operating at richer than stoichiometric air fuel ratio (AFR) in response to the first sensed cylinder acceleration being higher than the first calibrated acceleration, or indicating the cylinder as operating at leaner than stoichiometric AFR in response to the first sensed cylinder acceleration being lower than the first calibrated acceleration.

8. The method of claim 4, wherein the confirming is further based on the first sensed cylinder acceleration being equal to a second calibrated acceleration of the cylinder, the second calibrated acceleration estimated at the engine speed and load condition with the engine operating at non-stoichiometric air fuel ratio, and wherein the second calibrated acceleration is retrieved from the another calibration profile.

9. The method of claim 1, wherein confirming based on the exhaust air-fuel ratio includes confirming based on the exhaust air-fuel ratio weighted by a first confidence factor, confirming based on the exhaust manifold pressure includes confirming based on the exhaust manifold pressure weighted by a second confidence factor, and confirming based on individual cylinder torque includes confirming based on the individual cylinder torque weighted by a third confidence factor.

10. The method of claim 9, wherein the exhaust air-fuel ratio is estimated via an exhaust gas sensor, wherein the exhaust manifold pressure is estimated via a pressure sensor, and wherein the individual cylinder torque is estimated via a crankshaft torque sensor.

11. The method of claim 9, wherein one or more of the first, the second, and the third confidence factors are adjusted for each cylinder based on engine operating conditions.

12. The method of claim 10, wherein adjusting based on engine operations include, for an engine cylinder, decreasing the first confidence factor during engine warm-up after a cold start, decreasing the second confidence factor with increased distance between the pressure sensor and the engine cylinder, and increasing the third confidence factor during leaner than stoichiometric engine operation.

13. The method of claim 1, further comprising, in response to the indication, applying an air-fuel ratio correction to the imbalanced cylinder, the air-fuel ratio correction including a corrected fuel injection amount, wherein a fuel injector pulsewidth of a fuel injector actuator is adjusted to provide the corrected fuel injection amount.

14. A method for an engine, comprising:
during calibration, generating distinct calibration profiles for each engine cylinder including cylinder acceleration values estimated at a plurality of engine speed and load conditions with the engine operating at one or more air-fuel ratios;
during cylinder-to-cylinder imbalance diagnostics, estimating distinct cylinder acceleration values for each engine cylinder at an engine speed-load condition and stoichiometric air-fuel ratio;
for each cylinder, estimating a difference between the estimated distinct cylinder acceleration value and the corresponding calibration value; and
indicating a cylinder as imbalanced based on an estimated cylinder acceleration value for the cylinder and corresponding calibration values for each engine cylinder;
wherein the cylinder is indicated imbalanced in response to a difference between the estimated cylinder acceleration value for the cylinder and the corresponding calibration value for the cylinder being higher than a threshold and the difference being higher than an average difference for all other cylinders.

15. The method of claim 14, wherein the corresponding calibration values for each cylinder are retrieved from the distinct calibration profiles for each cylinder, the corresponding calibration values generated during engine operation at the engine speed-load condition and stoichiometric air-fuel ratio.

16. The method of claim 14, further comprising, estimating an air-fuel ratio at the imbalanced cylinder based on the difference, and confirming the indication of imbalance based on the estimated cylinder acceleration value for the cylinder being equal to another corresponding calibration value, the another corresponding calibration value retrieved from the distinct calibration profiles for each cylinder, the another corresponding calibration value generated during engine operation at the engine speed-load condition and the air-fuel ratio at the imbalanced cylinder.

17. An engine system, comprising:
a plurality of cylinders; and
a controller with computer readable instructions stored on non-transitory memory that when executed cause the controller to:
during stoichiometric engine operation at an engine speed-load condition, estimate cylinder acceleration for each cylinder via a crankshaft position sensor;
retrieve calibrated cylinder acceleration for each engine cylinder, the calibrated acceleration estimated during stoichiometric engine operation at the engine speed-load condition;
for each cylinder, estimate a difference between estimated cylinder acceleration and calibrated acceleration;
for each cylinder, estimate an average difference between estimated cylinder acceleration and calibrated acceleration for all other cylinders; and
in response to the difference being higher than a threshold and the difference being higher than the estimated average difference for a cylinder, indicate the cylinder as imbalanced.

18. The engine system of claim 17, wherein the controller includes further instructions to: confirm the indicating based on an estimated exhaust air-fuel ratio weighted by a first confidence factor, an exhaust pressure weighted by a second confidence factor, and an individual cylinder torque weighted by a third confidence factor, the exhaust air-fuel ratio estimated via an exhaust gas sensor, the exhaust pressure estimated via a pressure sensor, and the individual cylinder torque estimated via a crankshaft torque sensor.

19. The engine system of claim 18, wherein each of the first confidence factor, the second confidence factor, and the third confidence factor are calibrated for each cylinder based on engine temperature and engine speed-load condition.

* * * * *